(12) United States Patent
Deng et al.

(10) Patent No.: US 7,145,578 B2
(45) Date of Patent: Dec. 5, 2006

(54) SCALABLE OBJECT RECOGNITION ARCHITECTURE

(75) Inventors: Dixon De Sheng Deng, East Ryde (AU); Michael Anthony Martin, Macquarie Park (AU)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 11/070,210

(22) Filed: Mar. 3, 2005

(65) Prior Publication Data
US 2005/0210069 A1    Sep. 22, 2005

(30) Foreign Application Priority Data
Mar. 18, 2004   (AU) .............................. 2004901457

(51) Int. Cl.
*G06T 1/00* (2006.01)
(52) U.S. Cl. ..................................... 345/630
(58) Field of Classification Search .................. None
See application file for complete search history.

(56) References Cited

U.S. PATENT DOCUMENTS

| | | | | |
|---|---|---|---|---|
| 5,600,768 A * | 2/1997 | Andresen | ..................... | 345/629 |
| 5,926,185 A | 7/1999 | Vyncke et al. | ............... | 345/433 |
| 6,072,506 A * | 6/2000 | Schneider | ..................... | 345/533 |
| 6,362,825 B1 | 3/2002 | Johnson | ..................... | 345/522 |
| 6,469,704 B1 | 10/2002 | Johnson | ..................... | 345/553 |
| 6,577,577 B1 | 6/2003 | Watanabe et al. | .......... | 369/75.2 |
| 6,583,890 B1 | 6/2003 | Mastie et al. | ............... | 358/1.18 |
| 6,809,731 B1 * | 10/2004 | Muffler et al. | ............... | 345/428 |
| 7,023,439 B1 | 4/2006 | Martin et al. | ............... | 345/428 |
| 2006/0103671 A1 * | 5/2006 | Brown | ........................ | 345/629 |

FOREIGN PATENT DOCUMENTS

| | | |
|---|---|---|
| AU | 2004201227 A1 | 10/2004 |
| WO | WO 93/12501 | 6/1993 |

* cited by examiner

*Primary Examiner*—Mark Zimmerman
*Assistant Examiner*—Andrew Yang
(74) *Attorney, Agent, or Firm*—Fitzpatrick, Cella, Harper & Scinto

(57) ABSTRACT

A method of processing received objects in a rendering system determines whether a detection scheme which already has grouped objects exits. The rendering system has a plurality of detection schemes, with each detection schemes having an associated object group type. If such a detection scheme does not exist and a previously received object has been stored, then the method determines in descending priority order whether one of the detection schemes is operative to group the received object with the previously received object. If it is determined that none of the detection schemes is operative to group the received object with the previously received object, then the previously received object is output for rendering the received object is stored. If it is determined that one of the detection schemes is operative to group the received object with the previously received object, then the received object is grouped with the previously received object.

11 Claims, 8 Drawing Sheets

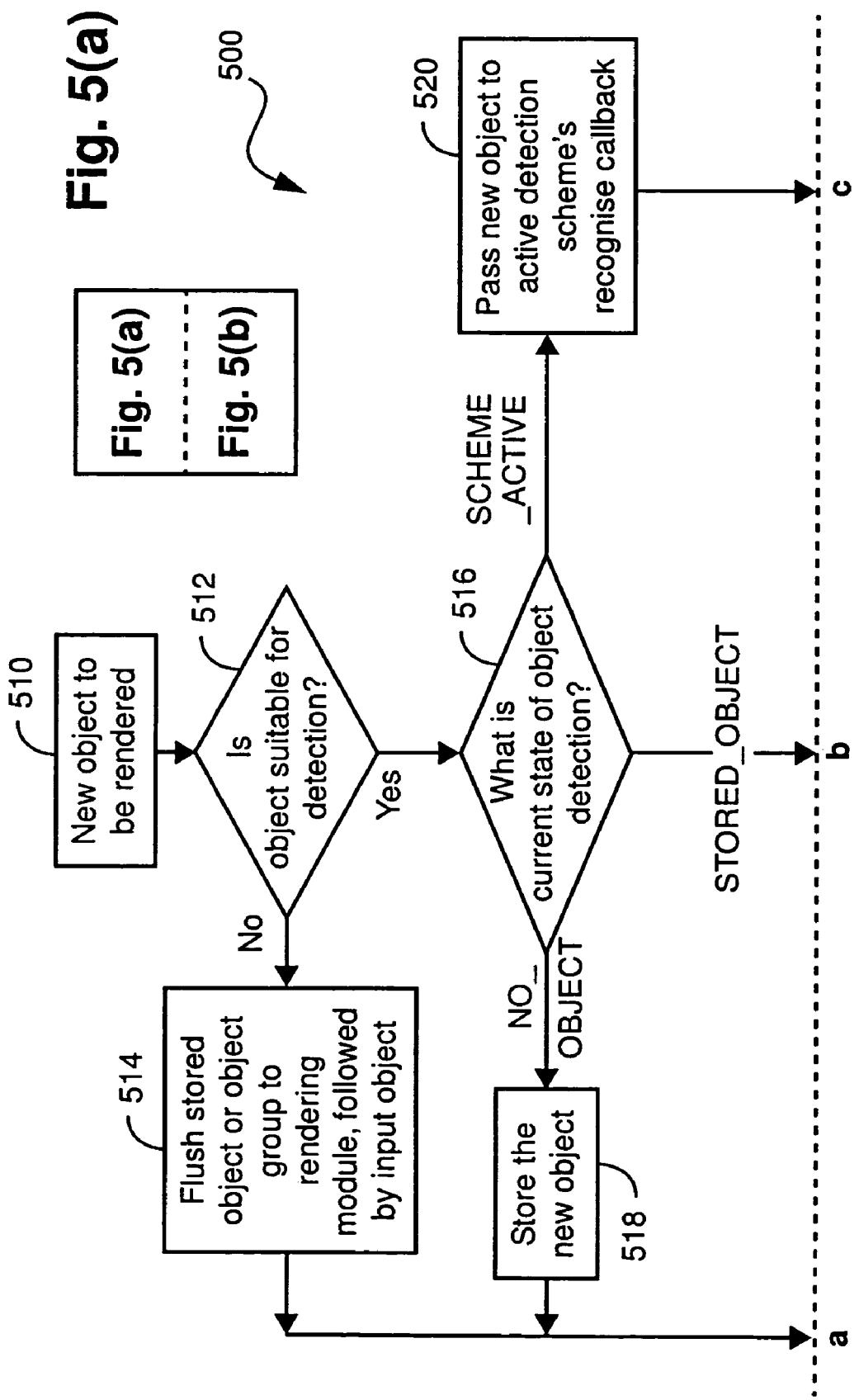

SCALABLE OBJECT RECOGNITION ARCHITECTURE

FIELD OF THE INVENTION

The present invention relates generally to the management of objects in an object rendering system and, in particular, to the management of graphical object detection schemes within the object rendering system.

BACKGROUND

Rendering is a process by which graphic objects are converted to pixels. The rendering is performed by a graphics rendering system which receives the graphic objects from an application program as graphic commands. Graphics rendering systems typically use a painters algorithm style of rendering where each graphic object is drawn onto a frame buffer as the graphic object arrives. Other graphics rendering systems use a 2-stage approach, where the graphics rendering system in a first stage converts all incoming graphic objects into some intermediate format for the page, and in a second stage renders a scanline at a time from the intermediate format.

No matter the type of graphics rendering system, efficiency problems are suffered due to the nature of some of the graphic commands received from the application programs. For example, a common drawing application program passes a gradient fill to the graphics rendering system as a group of adjacent overlapping rectangles, each with a slightly different flat colour, thereby giving the impression of a smooth gradient fill. Although true to the nature of the original object, the graphic objects are abundant with redundant data.

In an attempt to reduce the above inefficiencies, it has been proposed to detect simple graphic objects that may be combined into more complex graphic objects, and combining such graphic objects into object groups, thereby removing redundant data and reducing the number of raster operations. An object group, in this context, is used to describe a group of one or more objects that may be combined to form a more efficient (set of) object(s) specific to the graphics rendering system. The combined object(s) may be more complex than the group of single objects, but the graphics rendering system may be able to handle the object group(s) more efficiently. Single objects may be classified as an object group if such single objects are transformed into a format more desirable to the graphics rendering system than the format in which the objects were originally represented.

Object group detection schemes are typically used for determining whether or not the objects are able to be grouped to form a more efficient/desirable set of objects. System designers specifically tailor detection schemes to detect and "correct" these object inefficiencies. The "corrected" graphic object data, although most likely more complex than the original, would be optimised for the specific graphics rendering system, thus improving the rendering efficiency of such a system.

Each detection scheme detects and combines a different grouping of graphic objects to form a complex graphic object. Due to the fact that detection schemes often use one or more of the same objects, conflict amongst detection schemes typically occurs when the rendering system includes multiple detection schemes.

SUMMARY

It is an object of the present invention to substantially overcome, or at least ameliorate, one or more disadvantages of existing arrangements.

The present invention operates to eliminate the need for detection schemes of a graphics rendering system to communicate with each other.

According to an aspect of the present invention, there is provided a method of processing a received object in a rendering system, said rendering system having a plurality of detection schemes, each detection scheme being operative to group objects to form an associated object group, said method comprising the steps of:

determining, in descending priority order, whether one of said detection schemes is operative to group said received object with a previously received ungrouped object;

outputting for rendering said previously received ungrouped object if it is determined that none of said detection schemes is operative to group said received object with said previously received ungrouped object; and grouping said received object with said previously received ungrouped object if it is determined that one of said detection schemes is operative to group said received object with said previously received ungrouped object.

According to another aspect of the present invention, there is provided a method of processing a received object in a rendering system, said rendering system having at least one detection scheme, each detection scheme being operative to group objects to form an associated object group and one of said detection schemes having associated grouped objects, said method comprising the steps of:

determining whether said detection scheme having associated grouped objects is operative to group said received object with said grouped objects;

outputting for rendering said grouped objects if it is determined that said detection scheme having associated grouped objects is not operative to group said received object with said grouped objects; and grouping said received object with said grouped objects if it is determined that said detection scheme having associated grouped objects is operative to group said received object with said grouped objects.

According to another aspect of the present invention, there is provided a rendering system for implementing any one of the aforementioned methods.

According to yet another aspect of the present invention there is provided a computer program product including a computer readable medium having recorded thereon a computer program for implementing any one of the methods described above.

Other aspects of the invention are also disclosed.

BRIEF DESCRIPTION OF THE DRAWINGS

Some aspects of the prior art and one or more embodiments of the present invention will now be described with reference to the drawings, in which:

FIGS. 5(a) and 5(b) show a flow diagram of the process performed by the graphics rendering system according to the present disclosure for object detection.

DETAILED DESCRIPTION INCLUDING BEST MODE

Figure 1:
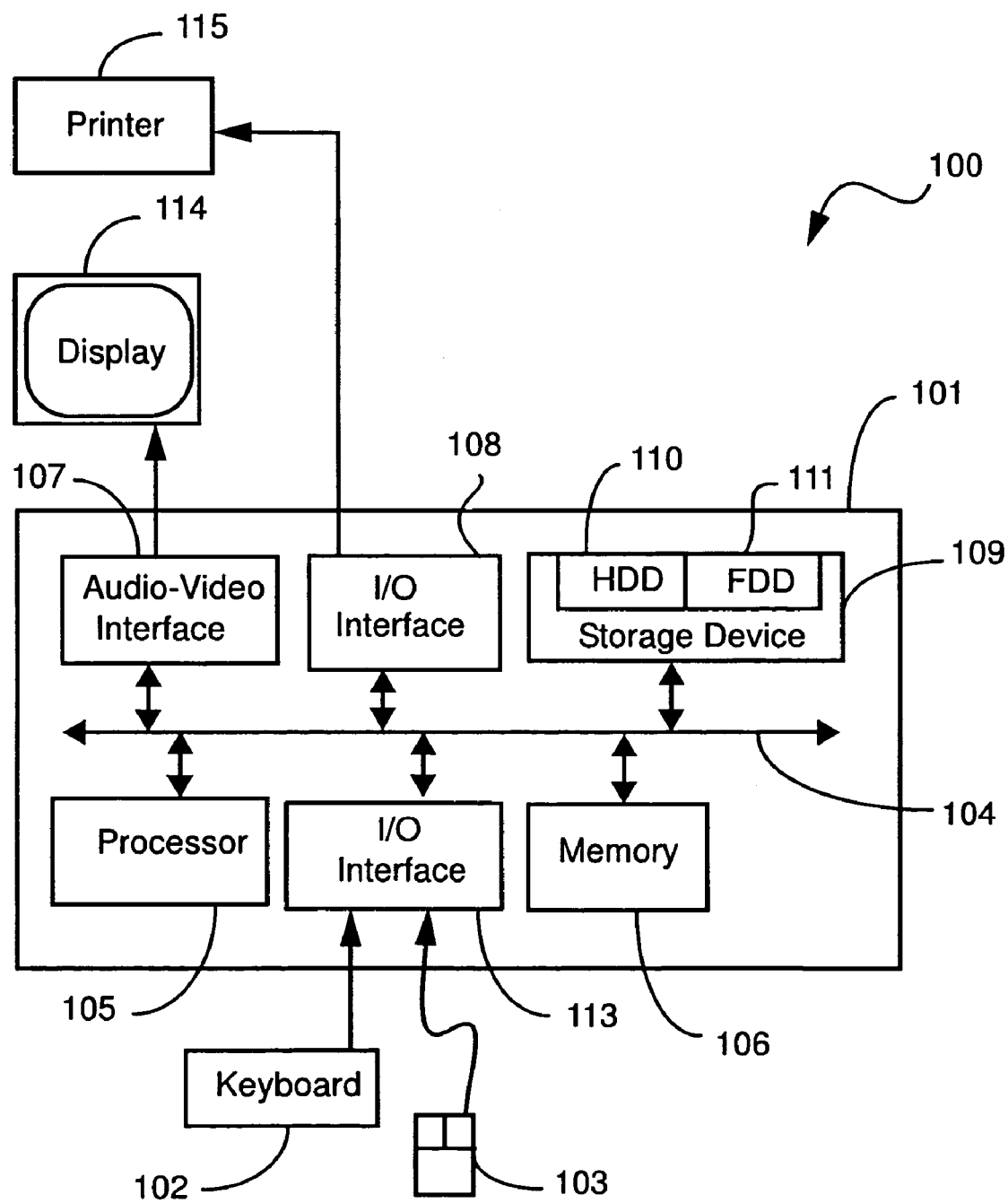
FIG. 1 illustrates a general-purpose computer system that may be used for rendering objects to one or more output devices of the computer system.

Where reference is made in any one or more of the accompanying drawings to steps and/or features, which have the same reference numerals, those steps and/or features have for the purposes of this description the same function(s) or operation(s), unless the contrary intention appears.

FIG. 1 illustrates a general-purpose computer system 100 that may be used for rendering objects to one or more output devices of the computer system 100, such as a display device 114 or a printing device 115. The computer system 100 is formed from a computer module 101, input devices such as a keyboard 102 and mouse 103, and the output devices including the printer 115 and the display device 114.

The computer module 101 includes at least one processor unit 105, a memory unit 106, a storage device 109 which typically includes a hard disk drive 110 and a floppy disk drive 111, and a number of input/output (I/O) interfaces. The input/output (I/O) interfaces include a video interface 107 that couples to the video display 114, an I/O interface 113 for the keyboard 102 and mouse 103, and an interface 108 for the printer 115. The components 105 to 113 of the computer module 101 communicate via an interconnected bus 104.

An operating system executing within the computer system 100 performs basic tasks, such as recognizing input from the keyboard 102 and mouse 103, sending output to the display screen 114 and printer 115, keeping track of files and directories on the storage device 109, and controlling the hard disk drive 110 and a floppy disk drive 111. The operating system also provides a software platform on top of which application programs execute.

Figure 2:
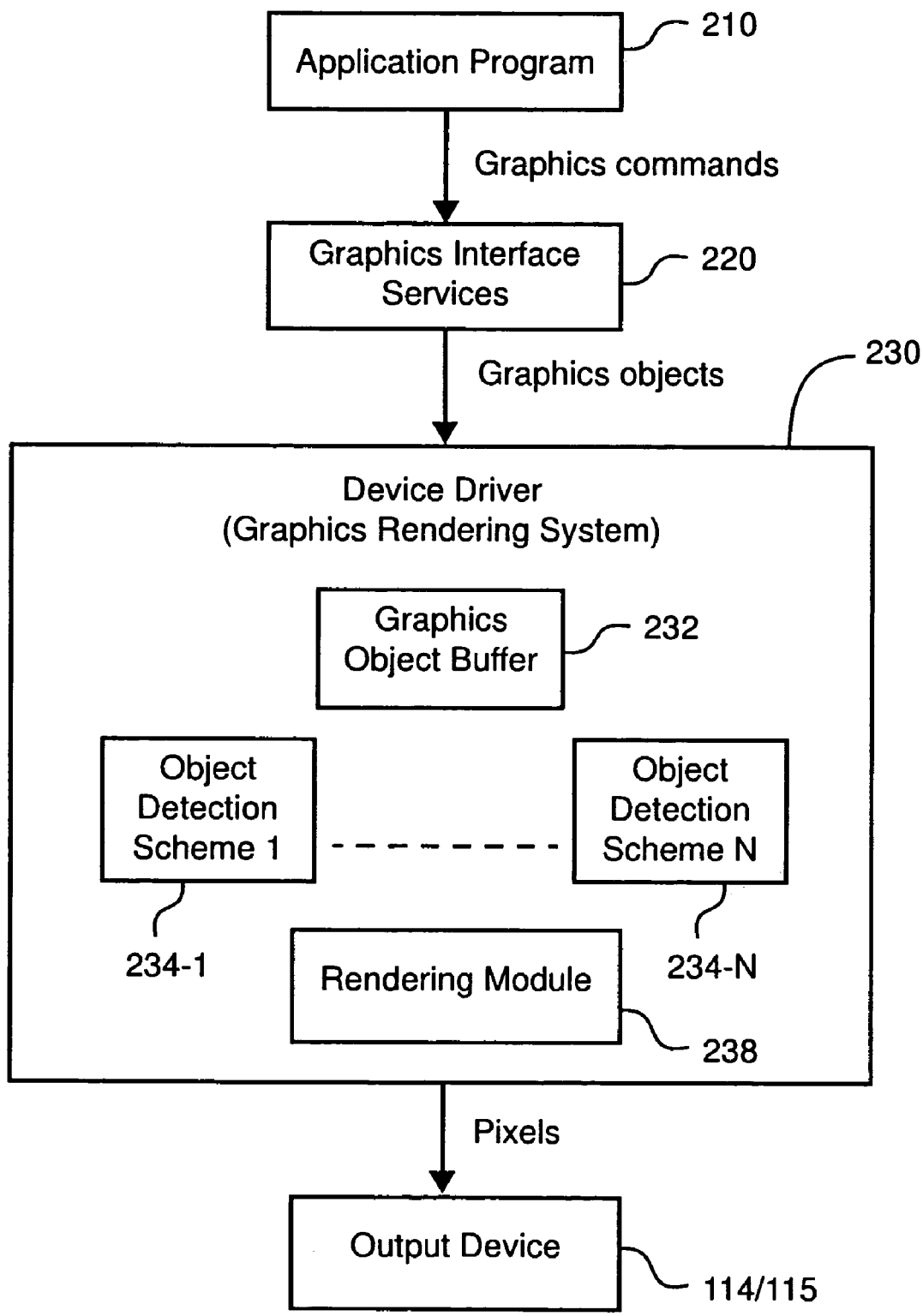
FIG. 2 illustrates modules of the computer system involved in rendering objects to output devices of the computer system.

FIG. 2 illustrates modules of the computer system 100 (FIG. 1) involved in a process of rendering objects to one of the output devices 114 or 115. An application program 210 executing within the processor 105 of the computer system 100, such as a word processor, creates page-based document data, where each page contains graphic objects. The graphic objects typically include text, lines, fill regions and image data.

When a document is to be rendered on the output device 114 or 115, the application program 210 passes each page of the document as a series of graphic commands to a graphics interface services (GIS) layer 220 provided by the native operating system of the computer system 100. The graphic commands describe the graphic objects of the page. The GIS layer 220 is generally an application programming interface providing a rich set of graphics functionality to all application programs.

The GIS layer 220 provides graphic objects to a device driver 230 in a format that the GIS layer 220 judges the device driver 230 would process most efficiently, and at a resolution of the output device 114 or 115. In fact, the GIS layer 220 mediates between the application program 210 and the output device 114 or 115, thereby enabling the device driver 230 to support a much smaller set of functionality, such as drawing rectangular blocks of image data, and filling simple regions with flat color.

The device driver 230, also known as a graphics rendering system, renders the graphics objects received from the GIS layer 220. Rendering is the process by which the graphics objects received from the GIS layer 220 are converted to pixels by the device driver 230. The pixels are sent to the output device 114 or 115. Whilst the application program 210 and the graphics interface services 220 are formed by software, the device driver 230 may be performed in software, hardware or a combination thereof.

In the preferred implementation, the process of rendering by the graphics rendering system 230 is effected by instructions in software that are carried out by the processor 105 of the general-purpose computer 100. The software may be stored in a computer readable medium, including the storage device 109, for example. A computer readable medium having such software or computer program recorded on it is a computer program product.

Figure 4A:
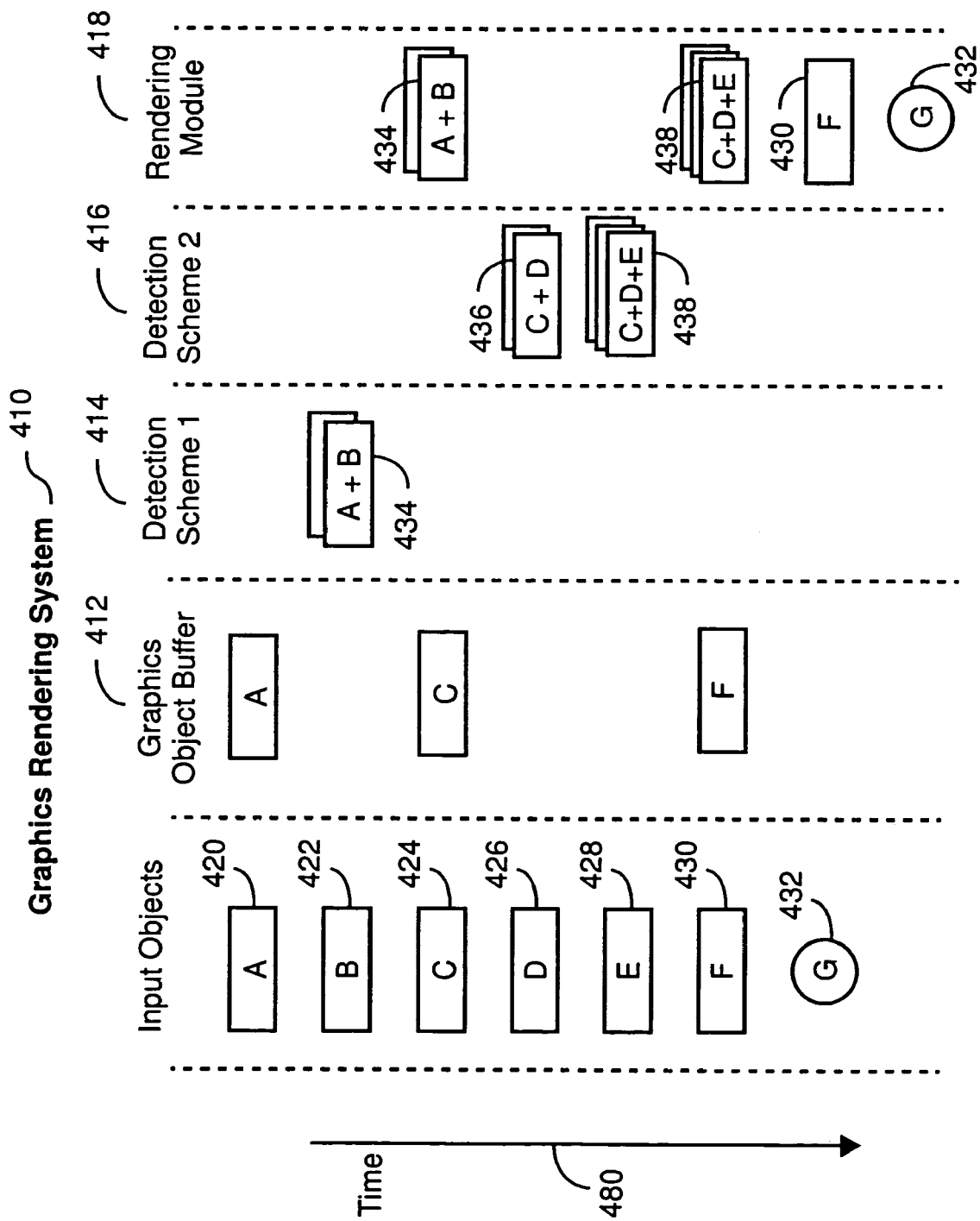
FIG. 4A illustrates an example graphics rendering system according to the present disclosure.

The graphics rendering system 230 includes a graphics object buffer 232, a number (N) of object detection schemes 234-1 through 234-N, and a rendering module 238, all of which are preferably effected by instructions executed by the processor 105. The operation of the graphics rendering system 230, and its components 232, 234-1 through 234-N, and 238 is described below with reference to FIG. 5, and also by way of example with reference to FIGS. 4A and 4B.

Figure 3A:
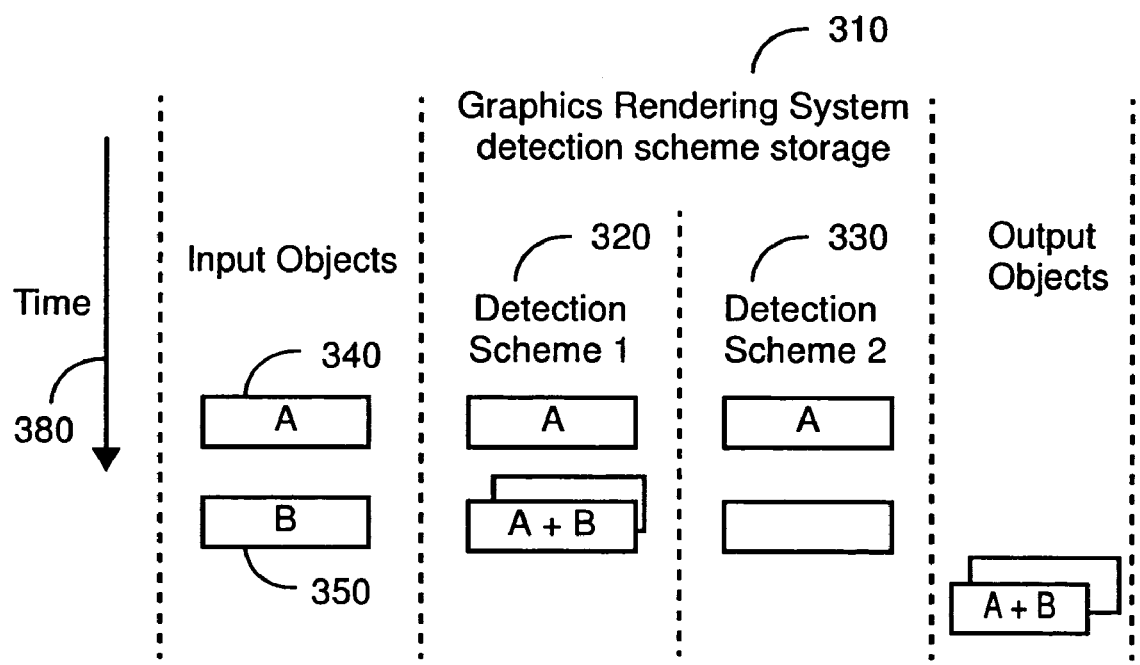
FIG. 3A shows a graphics rendering system with multiple detection schemes.
Figure 3B:
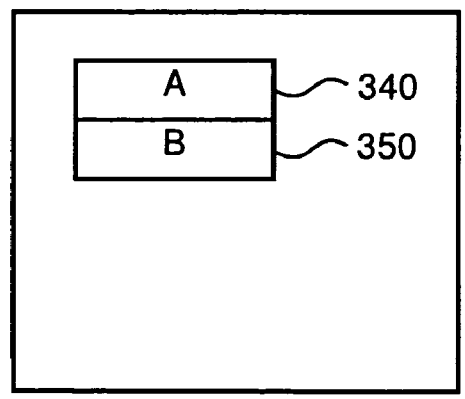
FIG. 3B shows the graphical relationship between input objects in FIG. 3A.

Before describing the graphics rendering system 230 according to the present disclosure, and in an attempt to better illustrate the conflict that occurs amongst detection schemes when the rendering system includes multiple detection schemes where the detection schemes use one or more of the same objects, FIG. 3A shows a graphics rendering system 310 with two detection schemes 320 and 330 and a vertical time axis 380. Each detection scheme 320 or 330 combines simple graphics objects into a graphics object group of a different type. Detection scheme 320 combines multiple rectangle objects that adjoin each other into a single rectangle object. Detection scheme 330 combines non-adjoining rectangle objects into a single object consisting of multiple rectangles. FIG. 3B shows the graphical relationship between rectangular input objects 340 and 350.

Referring again to FIG. 3A, when input object 340 is received by the graphics rendering system 310, both detection schemes 320 and 330 detect object 340 as a simple object that may be used to form their respective graphics object groups. This results in the detection schemes 320 and 330 both maintaining a reference to object 340.

However, when input object 350 (a rectangle object adjoined to input object 340) is received by the graphics rendering system 310, only detection scheme 320 is able to combine input object 350 with input object 340 because objects 340 and 350 are adjoining. Unless detection scheme 330 has knowledge that detection scheme 320 has combined input objects 340 and 350, detection scheme 330 may output object 340, which is not an efficient output of grouped graphics objects within graphics rendering system 310. So each detection scheme 320 or 330 has to communicate with other detection schemes to ensure that an input object is rendered only once, either as a simple object by itself or as part of a graphics object group.

The requirement that each detection scheme communicates with one another greatly reduces the ease at which new detection schemes may be implemented. As more detection schemes are added to the graphics rendering system 310, communication protocols typically grow in complexity, which has the adverse effect of reducing execution speed and increasing software complexity within the graphics rendering system 310. Accordingly, the cost of implementing a new object group detection scheme is increased.

Figure 5B:
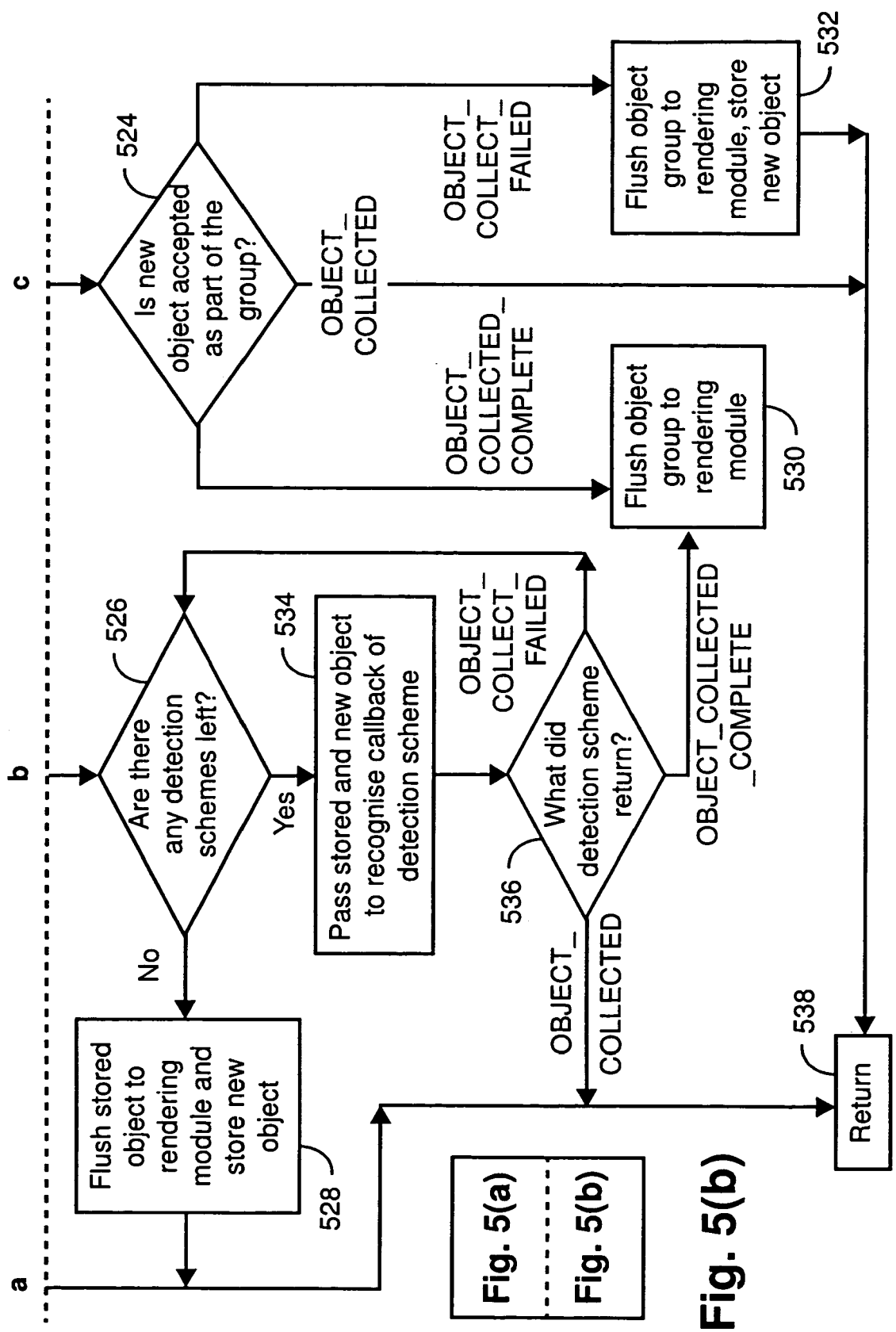

FIG. 5 is a flow diagram of a process 500 performed by the graphics rendering system 230 of the present disclosure for each input object passed in by the GIS layer 220. Before describing process 500 in detail, the operation of the graphics rendering system 230 is first described by way of an example graphics rendering system 410 illustrated in FIG. 4A, with a vertical time axis 480. The graphics rendering system 410 includes a graphics object buffer 412, two detection schemes 414 and 416 and a rendering module 418, all of which are preferably effected by instructions executed by the processor 105 of the general purpose computer 100 shown in FIG. 1.

Figure 4B:
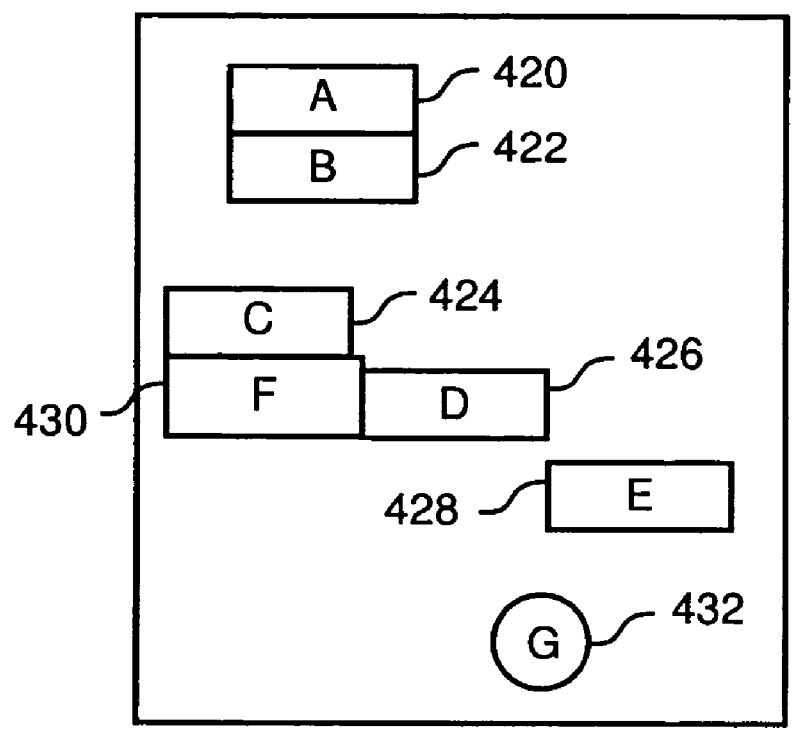
FIG. 4B shows the graphical relationship between input objects in FIG. 4A.

FIG. 4B shows the graphical relationship between input objects 420 through 432. Objects 420 through 430 are all rectangles, whereas object 432 is a circle. Rectangles 420 and 422 are adjoining, with rectangle 420 being above rectangle 422. Rectangle 430 has rectangle 424 adjoined to the top thereof, and rectangle 426 to the right thereof. Rectangle 428 and circle 432 are not adjoined to any other objects. Each object 420 through 432 also has a respective object type which determines whether the object is filled with a colour or an image.

Detection scheme 414 detects multiple rectangle objects that adjoin each other and combines them into a single rectangular object. Detection scheme 416 detects non-adjoining rectangle objects and combines them into a single object consisting of multiple rectangles.

Detection scheme 414 has higher priority than detection scheme 416 because detection scheme 414 produces an object group which requires less memory resources for storage, and therefore can be more effectively rendered. The rendering effectiveness of a detection scheme, which affects its relative priority, is determined by the amount of reduction in graphics rendering system 410 resources (such as memory) required to render the object group as compared to rendering each simple graphics object used to form the object group.

Rendering effectiveness is not the only factor affecting detection scheme priority. In an alternative implementation other factors may be used to determine detection scheme priority, such as detection complexity, object group complexity, resources needed for detection, etc. In yet another implementation totally random detection scheme priorities that are not dependent on any property of the detection schemes themselves may be used.

A detection scheme is considered to be active if it has detected one or more graphics objects but has not yet completed an object group formed by the detection scheme. At most one detection scheme may be active at any point in time.

Each detection scheme has two callback functions associated thereto: A recognise callback function and a flush callback function. A detection scheme responds to the recognise callback function by reporting on its detection status by sending a status flag which may have one of the following meanings:

OBJECT_COLLECTED—The new object has been collected as part of the detection scheme's object group; part of the detection scheme's object group and also completed the detection scheme's object group; and OBJECT_COLLECT_FAILED—The new object cannot be collected as part of the detection scheme's object group.

In an alternative implementation the OBJECT_COLLECTED_COMPLETE status flag may be omitted from the recognise callback function, since OBJECT_COLLECT_FAILED may be used to flush a previously completed object group when a new input object is received by the graphics rendering system 410.

The flush callback function causes the detection scheme to output its object group to rendering module 418 for rendering if there is a complete or incomplete object group, or does nothing if the detection scheme is not active.

An alternative implementation may implement the flush callback such that a complete or incomplete object group is output to either the rendering module 418 or as a new input object into graphics rendering system 410 for further detection.

The graphics rendering system 410 is aware of the basic properties that make graphic objects suitable for detection by each detection scheme. The object's type (for example, a flat colour object or an image object) and whether the rendering context has changed are examples of the basic properties used to determine whether a graphics object is suitable for detection by each detection scheme. So, each input graphics object to graphics rendering system 410 is pre-processed to determine whether the object satisfies the basic properties that would make that input graphics object suitable for any detection scheme. A graphics object that satisfies the basic properties of a detection scheme can potentially be detected by that scheme, but it is not guaranteed that the graphics object will form part of the detection scheme's object group.

An alternative implementation may choose not to pre-process objects for detection suitability because unsuitable objects will be rejected by the recognise callback function of the detection schemes. Another alternative implementation could be for each detection scheme to provide an is_suitable callback function, thereby allowing graphics rendering system 410 to use the is_suitable callback function to pre-process and determine whether graphic objects are suitable for detection by each detection scheme, rather than graphics rendering system 410 being aware of the basic properties that make graphic objects suitable for detection by each detection scheme.

Yet another alternative implementation can further pre-process an input object before determining its suitability for object detection by merging any clipping objects with the input object. This will simplify the drawing path of the input object, which may make the input object more suitable for object detection.

When the graphics rendering system 410 receives input object 420, which is a rectangle, either of the detection schemes 414 or 416 can detect object 420, and use such a rectangular object to form its respective object group. However, graphics rendering system 410 does not pass input object 420 to either detection scheme 414 or 416, but stores the input object 420 in the graphics object buffer 412, along with its associated data (such as colour, drawing path, etc).

When the graphics rendering system 410 receives input object (rectangle) 422, the input object (rectangle) 420 stored in graphic object buffer 412 is passed to detection scheme 414 (which has priority over detection scheme 416) via the recognise callback function, along with input object (rectangle) 422. Since detection scheme 414 collects adjoining rectangles into a single rectangle object, and input objects 420 and 422 adjoin each other, detection scheme 414 forms an object group 434 from the rectangles 420 and 422, returns status OBJECT_COLLECTED, and becomes active.

Input objects 420 and 422 are not passed to the detection scheme 416 because only one scheme may be active at any point in time. An alternative implementation may choose to store more than one object in the graphics object buffer 412 before passing input objects to detection schemes 414 and 416.

When graphics rendering system 410 receives the next input object 424, which is also a rectangle, detection scheme 414 is already active, so input object (rectangle) 424 is given directly to detection scheme 414 via the recognise callback function. However, input object 424 is not accepted by detection scheme 414 as part of the active object group 434. Because the new object 424 cannot be collected as part of the active object group 434, detection scheme 414 returns a stutus OBJECT_COLLECT_FAILED causing the active object group 434 to being output to the rendering module 418 by the flush callback function, while input object 424 is stored in graphics object buffer 412.

An alternative implementation may choose to not store input object 424 in graphics object buffer 412 but output object 424 to rendering module 418 after the active object group 434.

When graphics rendering system 410 receives input object 426, which is another rectangle, both input objects 424 and 426 are given to detection scheme 414 only for object detection via the recognise callback function because detection scheme 4141 has the highest priority. However, detection scheme 414 is unable to form an object group from input objects 424 and 426 because objects 424 and 426, even though they are rectangles, do not adjoin each other. Accordingly, the recognise callback function returns status OBJECT_COLLECT_FAILED. Graphics rendering system 410 responds by passing input objects 424 and 426 to detection scheme 416. Since detection scheme 416 is able to form an object group from non-adjoining rectangle objects, input objects 424 and 426 form an object group 436 and detection scheme 416 becomes active.

The process continues by graphics rendering system 410 receiving input object 428. Input object 428 is passed directly to the active detection scheme 416, being active, using the recognise callback function. Since input object 428 is a non-adjoining rectangle from input objects 424 and 426, input object 428 is accepted as part of the object group 436 formed from input objects 424 and 426. Accordingly, the recognise callback function returns status OBJECT_COLLECTED and detection scheme 416 remains active with object group 438.

Graphics rendering system 410 next receives input object 430, which is a rectangle that adjoins both input objects 424 and 426. The active detection scheme 416 is unable to accept input object 430 as part of the object group 438, and the recognise callback function of detection scheme 416 returns status OBJECT_COLLECT_FAILED. In response to the status OBJECT_COLLECT_FAILED, the flush callback function is issued and the object group 438 formed from input objects 424, 426 and 428 is output for rendering to rendering module 418. Also, input object 430 is stored in graphics object buffer 412.

Finally the graphics rendering system 410 receives the last input object 432, which is a circle. A circle is not detectable by either of the detection schemes 414 or 416. This results in the input object (rectangle) 430 stored in the graphics object buffer 412 to be output to the rendering module 418, followed by the input object (circle) 432.

The process 500 performed by the graphics rendering system 230 (FIG. 2) for each input object passed thereto by the GIS layer 220 is now described in detail with reference to FIG. 5. The steps of process 500 are affected by software loaded into memory 106 (FIG. 1) and executed by the processor 105 (FIG. 1).

The graphics rendering system 230 starts process 500 in step 510 where new objects to be rendered are input into graphics rendering system 230 from the GIS layer 220. Step 512 pre-processes object data received in step 510 by examining object properties, such as object type and object colour, to filter out input objects that are not suitable for object group detection. That is, input objects not groupable by any of the detection schemes 234-1 through 234-N are filtered out, or rejected. If an input object is rejected in step 512, then step 514 follows where any input object stored by graphics object buffer 232 or object group stored by an active detection scheme 234 is output to rendering module 238 by the flush callback function, followed by the rejected input object. Process 500 then continues to step 538 where process 500 returns.

In the case where it is determined in step 512 that the input object is suitable for detection, process 500 continues to step 516 where the current state of object detection in graphics rendering system 230 is determined.

If there are no active detection schemes and no objects stored in graphics object buffer 232, then the state is NO_OBJECT and process 500 continues to step 518, where the new object is stored in the graphics object buffer 232. Process 500 then continues to step 538 where process 500 returns.

In the case where it is determined in step 516 that there is one object stored in the graphics object buffer 232, then the state is STORED_OBJECT and the process 500 continues to step 526 where graphics rendering system 230 determines whether more detection schemes 234 exist. If there is at least one detection scheme left in the list of detection schemes, then process 500 continues to step 534 where both the new object and the object stored in the graphics object buffer 232 are passed to a next detection scheme of graphics rendering system 230 with the recognise callback function. The next detection scheme used in step 534 is the scheme that has the highest priority in the list of detection schemes available in the rendering system 230.

Process 500 then continues to step 536, where the status returned by the recognise callback function of step 534 is checked. If the status returned by the recognise callback function indicates a new object group has been formed, that is the returned value is OBJECT_COLLECTED, then process 500 continues to step 538 where process 500 returns.

If step 536 receives a status indicating that a new object group has been formed and the object group is complete, that is the returned value is OBJECT_COLLECTED_COMPLETE, then step 530 is executed to flush the completed object group to rendering module 238. Process 500 then continues to step 538 where process 500 returns.

If step 536 receives a status that indicates the detection scheme failed to form an object group between the object in graphic object buffer 232 and the object received in step 510, that is the value returned by the recognise callback function is OBJECT_COLLECT_FAILED, then process 500 returns to step 526 until all possible detection schemes 234 in graphics rendering system 230 have been exhausted, at which point process 500 proceeds to step 528.

In step 528, the input object stored by graphics object buffer 232 is output to the rendering module 238, and the input object received in step 510 is stored into graphics object buffer 232. Process 500 then continues to step 538 where process 500 returns.

Referring again to step 516, if it is determined that there is an active detection scheme 234, then the current state is SCHEME_ACTIVE and the process 500 continues to step 520, where the input object received in step 510 is passed to the active detection scheme with the recognise callback function. Process 500 then proceeds to step 524 where the return value of the recognise callback function in step 520 is checked.

If the return value is OBJECT_COLLECTED_COMPLETE, that is an existing object group is complete, then step 530 is executed to call the flush callback function of the active detection scheme 234 to output the completed object group to rendering module 238. Process 500 then continues to step 538 where process 500 returns.

If step 524 receives status OBJECT_COLLECTED, that is the input object received at step 510 has been accepted as part of the active detection scheme's object group, then step 538 is executed for process 500 to return.

If step 524 receives status OBJECT_COLLECT_FAILED, that is the detection scheme failed to add the input object received at step 510 to the active detection scheme's object group, then step 532 will call the flush callback function of the active detection scheme to output the active detection scheme's object group to rendering module 238, and then store the object received in step 510 into graphics object buffer 232. Process 500 then continues to step 538 where process 500 returns.

Figure 6:
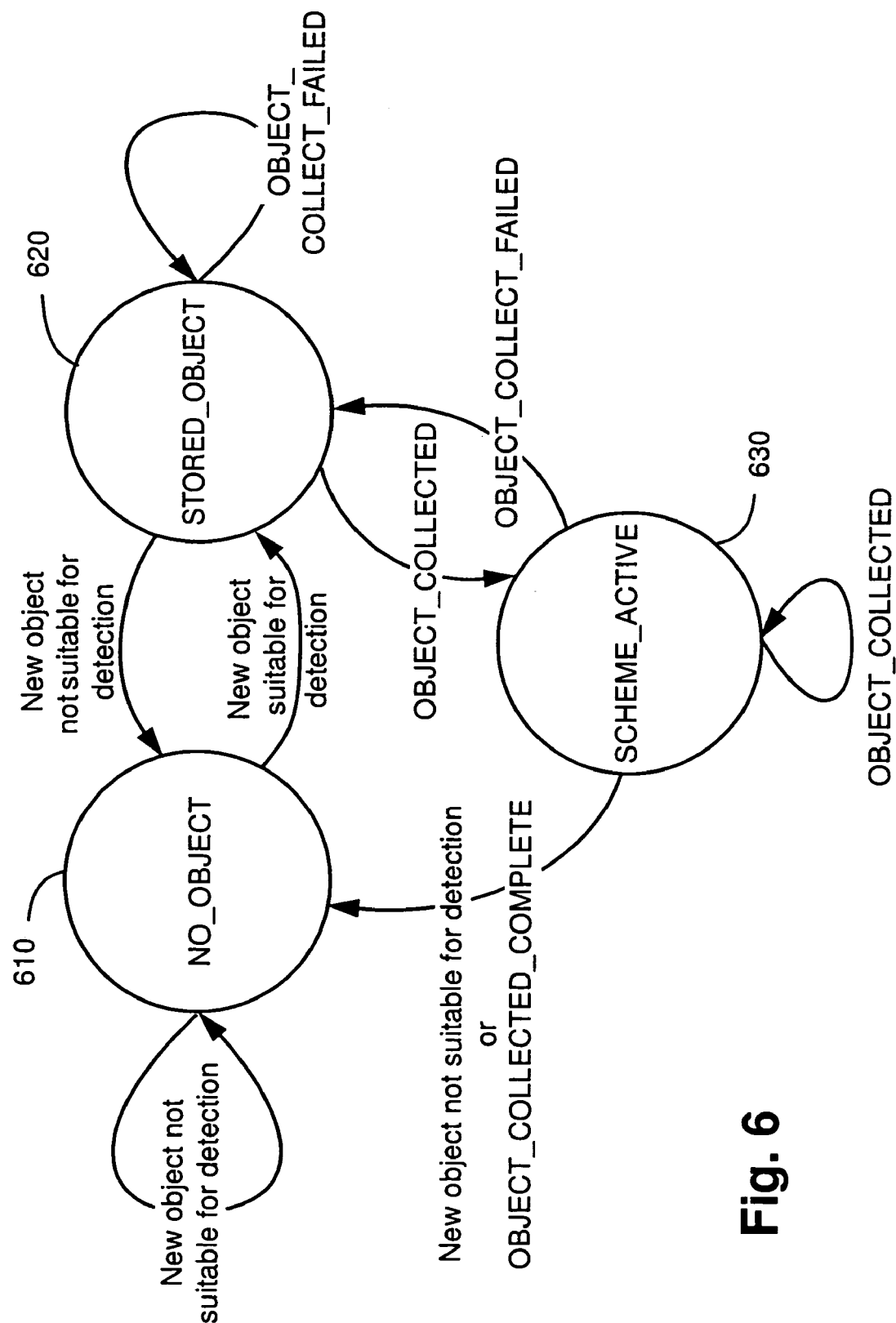
FIG. 6 shows the state transitions within the graphics rendering system for object detection.

FIG. 6 shows the detection state transitions achieved by process 500 within graphic rendering system 230. The initial state of graphics rendering system 230 is NO_OBJECT 610 because the GIS layer 220 has not given any graphics objects to the graphics rendering system 230.

Process 500 transits from state NO_OBJECT 610 to state STORED_OBJECT 620 if graphics rendering system 230 receives a new input object from the GIS layer 220 and the new input object is deemed to be suitable for detection in step 512. Process 500 remains in state NO_OBJECT 610 if the input object received by graphics rendering system 230 is rejected in step 512.

Process 500 transits from state STORED_OBJECT 620 to state NO_OBJECT 610 if the input object received by graphics rendering system 230 is rejected by step 512. Process 500 remains in state STORED_OBJECT 620 if the input object received by graphics rendering system 230 is suitable for object detection, but cannot form an object group with the input object stored in graphics object buffer 232. Process 500 transits from state OBJECT_STORED 620 to state SCHEME_ACTIVE 630 if the input object received by the graphics rendering system 230 is suitable for object detection and forms an object group with the input object stored in the graphics object buffer 232.

Process 500 transits from state SCHEME_ACTIVE 630 to state NO_OBJECT 610 if the input object received by graphics rendering system 230 is either rejected in step 512 or the recognise callback function in step 520 returned status OBJECT_COLLECTED_COMPLETE. Process 500 remains in state SCHEME_ACTIVE 630 if the status returned in step 520 is OBJECT_COLLECTED. Process 500 transits from state SCHEME_ACTIVE 630 to state STORED_OBJECT 620 if the input object received by the graphics rendering system 230 is considered suitable for object detection in step 512 but step 520 returns OBJECT_COLLECT_FAILED.

As can be seen from the above description, by eliminating the need for detection schemes 234-1 through 234-N to communicate with each other, and by providing a well defined interface and framework in which to implement object detection schemes 234-1 through 234-N, new detection schemes may be implemented with no knowledge of other pre-existing detection schemes 234-1 through 234-N in the graphics rendering system 230.

The foregoing describes only some embodiments of the present invention, and modifications and/or changes can be made thereto without departing from the scope and spirit of the invention, the embodiments being illustrative and not restrictive.

We claim:

1. A method of processing a received object in a rendering system, said rendering system having a plurality of detection schemes, each detection scheme being operative to group objects to form an associated object group, said method comprising the steps of:

determining, in descending priority order, whether one of said detection schemes is operative to group said received object with a previously received ungrouped object;

outputting for rendering said previously received ungrouped object if it is determined that none of said detection schemes is operative to group said received object with said previously received ungrouped object; and grouping said received object with said previously received ungrouped object if it is determined that one of said detection schemes is operative to group said received object with said previously received ungrouped object.

2. The method of claim 1 comprising the further initial steps of:

determining whether one of said detection schemes has one or more grouped objects associated therewith;

if one of said detection schemes has one or more grouped objects associated therewith, determining whether said one detection scheme is operative to group said received object with said one or more grouped objects;

outputting for rendering said one or more grouped objects if it is determined that said one detection scheme is not operative to group said received object with said one or more grouped objects; and grouping said received object with said one or more grouped objects if it is determined that said one detection scheme is operative to group said received object with said one or more grouped objects.

3. The method of claim 1 comprising the further steps, if said received object has been grouped, of:

determining whether the grouping step completes the object group associated with the detection scheme that grouped said received object; and outputting for rendering said object group if it is determined that said grouping step completes said object group.

4. The method of claim 1 comprising the further step of:

storing said received object in a temporary buffer if said received object has not been grouped.

5. The method as claimed in claim 1 comprising the initial steps of:

determining whether said received object is suitable for grouping by said detection schemes; and if said received object is not suitable for grouping by said detection schemes, outputting said received object for rendering.

6. The method as claimed in claim 5 comprising the further step of outputting any grouped objects for rendering.

7. The method as claimed in claim 1 comprising the initial step of pre-processing said received object with any clipping objects that may exist, and merging any said clipping object with said received object.

8. A rendering system for processing a received object, said rendering system comprising:
- a plurality of detection schemes, each detection scheme being operative to group objects to form an associated object group;
- means for determining, in descending priority order, whether one of said detection schemes is operative to group said received object with a previously received ungrouped object;
- means for outputting said previously received ungrouped object for rendering if said determining means determines that none of said detection schemes is operative to group said received object with said previously received ungrouped object; and
- means for passing said received object and said previously received ungrouped object to the detection scheme that is operative to group said received object with said previously received ungrouped object for grouping if said determining means determines that one of said detection schemes is operative to group said received object with said previously received ungrouped object.

9. The rendering system of claim 8 further comprising:
- means for determining whether the grouping completes the object group associated with the detection scheme that grouped said received object if said received object has been grouped; and
- outputting for rendering said object group if it is determined that said grouping step completes said object group.

10. The rendering system of claim 9 further comprising:
- buffer for storing said received object if said received object has not been grouped.

11. A computer readable medium comprising a computer program for processing a received object in a rendering system, said rendering system having a plurality of detection schemes, each detection scheme being operative to group objects to form an associated object group, said computer program when executed on a computing device performs the steps of:
- determining, in descending priority order, whether one of said detection schemes is operative to group said received object with a previously received ungrouped object;
- outputting for rendering said previously received ungrouped object if it is determined that none of said detection schemes is operative to group said received object with said previously received ungrouped object; and
- grouping said received object with said previously received ungrouped object if it is determined that one of said detection schemes is operative to group said received object with said previously received ungrouped object.

* * * * *

UNITED STATES PATENT AND TRADEMARK OFFICE
CERTIFICATE OF CORRECTION

PATENT NO. : 7,145,578 B2
APPLICATION NO. : 11/070210
DATED : December 5, 2006
INVENTOR(S) : Dixon De Sheng Deng et al.

It is certified that error appears in the above-identified patent and that said Letters Patent is hereby corrected as shown below:

On the Title Page; Items:

[30] FOREIGN APPLICATION PRIORITY DATA:

"2004901457" should read --2004-901457--.

[57] ABSTRACT:

Line 3, "exits." should read --exists.--.
Line 5, "schemes" should read --scheme--.
Line 13, "object" should read --object which--.

COLUMN 1:

Line 18, "painters" should read --painter's--.

COLUMN 5:

Line 63, "group; part" should read --group; ¶
OBJECT_COLLECTED_COMPLETE—The new object has been collected as part--.

COLUMN 7:

Line 27, "detection scheme 4141" should read --detection scheme 414--.

UNITED STATES PATENT AND TRADEMARK OFFICE
CERTIFICATE OF CORRECTION

PATENT NO. : 7,145,578 B2
APPLICATION NO. : 11/070210
DATED : December 5, 2006
INVENTOR(S) : Dixon De Sheng Deng et al.

It is certified that error appears in the above-identified patent and that said Letters Patent is hereby corrected as shown below:

COLUMN 8:

Line 1, "affected" should read --effected--.

Signed and Sealed this

Tenth Day of June, 2008

JON W. DUDAS
*Director of the United States Patent and Trademark Office*